United States Patent [19]

Araki et al.

[11] Patent Number: 4,906,306
[45] Date of Patent: Mar. 6, 1990

[54] AMORPHOUS METAL-METAL COMPOSITE ARTICLE, A METHOD FOR PRODUCING THE SAME, AND A TORQUE SENSOR USING THE SAME

[75] Inventors: Masatada Araki, Handa; Yutaka Kuroyama; Yukihisa Takeuchi, both of Chita; Makoto Takagi, Okazaki; Yoshihito Kawamura, Ohbu; Toru Imura, Nagoya, all of Japan

[73] Assignees: Nippon Oil and Fats Co., Ltd., Tokyo; Nippon Denso Co., Ltd., Kariya, both of Japan

[21] Appl. No.: 209,366
[22] Filed: Jun. 21, 1988

[30] Foreign Application Priority Data

Jun. 29, 1987 [JP] Japan .................. 62-159872

[51] Int. Cl.⁴ ............................ G01L 3/10; B22F 7/00
[52] U.S. Cl. ............................... 148/11.5 Q; 148/127; 148/403
[58] Field of Search ................... 148/403, 127, 11.5 Q

[56] References Cited

U.S. PATENT DOCUMENTS

| | | | |
|---|---|---|---|
| 3,861,206 | 1/1975 | Kawafune et al. | 73/141 R |
| 4,290,828 | 9/1981 | Aisaka et al. | 148/11.5 Q |
| 4,342,609 | 8/1982 | Beatovic et al. | 148/127 |
| 4,414,855 | 11/1983 | Iwasaki | 73/862.36 |
| 4,490,329 | 12/1984 | Hare et al. | 428/940 |
| 4,578,123 | 3/1986 | Schultz et al. | 148/11.5 Q |
| 4,585,617 | 4/1986 | Tenhover et al. | 148/403 |
| 4,621,031 | 11/1986 | Scruggs | 148/403 |
| 4,731,131 | 3/1988 | Sakata et al. | 148/127 |
| 4,755,237 | 7/1988 | Lemelson | 148/403 |
| 4,782,994 | 11/1988 | Raybould et al. | 148/403 |

FOREIGN PATENT DOCUMENTS

| | | |
|---|---|---|
| 57-211030 | 12/1982 | Japan . |
| 58-9034 | 1/1983 | Japan . |
| 59-7433 | 1/1984 | Japan . |
| 59-61729 | 4/1984 | Japan . |
| 60-194085 | 10/1985 | Japan . |
| 60-260821 | 12/1985 | Japan . |
| 61-18835 | 1/1986 | Japan . |
| 61-139629 | 6/1986 | Japan . |
| 61-195905 | 8/1986 | Japan . |
| 62-23905 | 1/1987 | Japan . |

OTHER PUBLICATIONS

Magnetic Society of Japan, 10th Autumn Meeting preprint No. 4PC-10, p. 61, Nov. 1986.

*Primary Examiner*—Upendra Roy
*Attorney, Agent, or Firm*—Arnold, White & Durkee

[57] ABSTRACT

A composite article comprising a metal and an amorphous metal bonded thereto by the explosion, being free from residual stress and compression stress in the amorphous metal portion, and having excellent magnetic properties inherent to the amorphous metal can be obtained by heating a composite article produced by bonding an amorphous metal to a metal through the explosion pressure to remove the residual stress caused in the amorphous metal during the explosion bonding, and then subjecting the heat treated composite article to a plastic working so as to give a tensile stress in the amorphous metal in an amount sufficient to offset the compression stress caused in the amorphous metal due to the heat treatment.

13 Claims, 4 Drawing Sheets

FIG_1
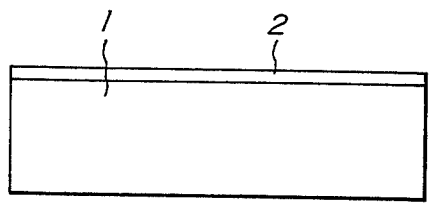
FIG_2
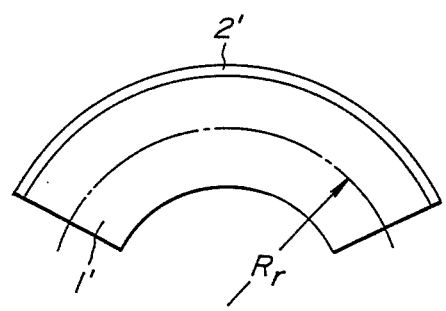

FIG_3
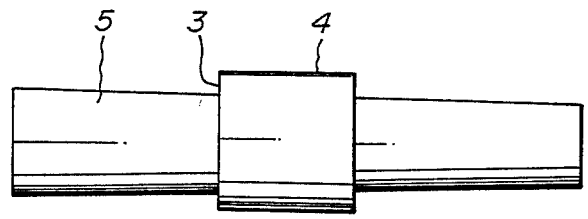
FIG_4
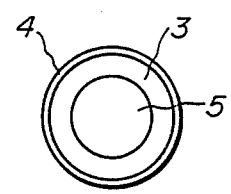

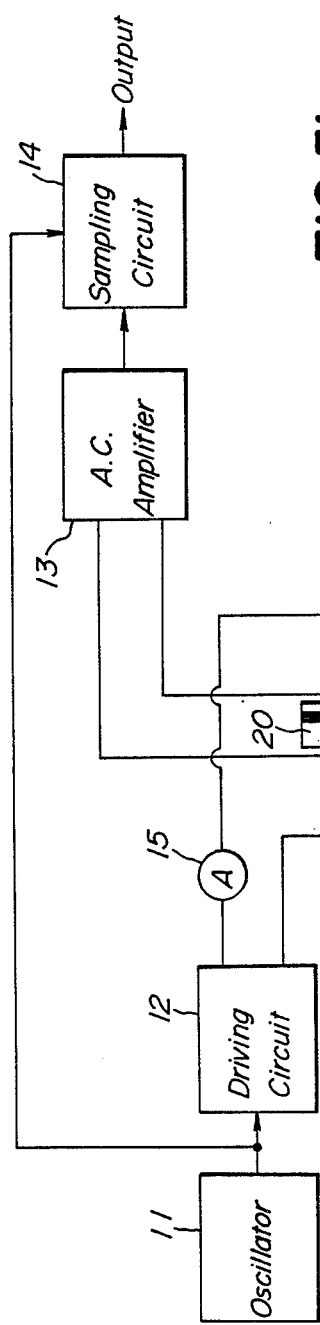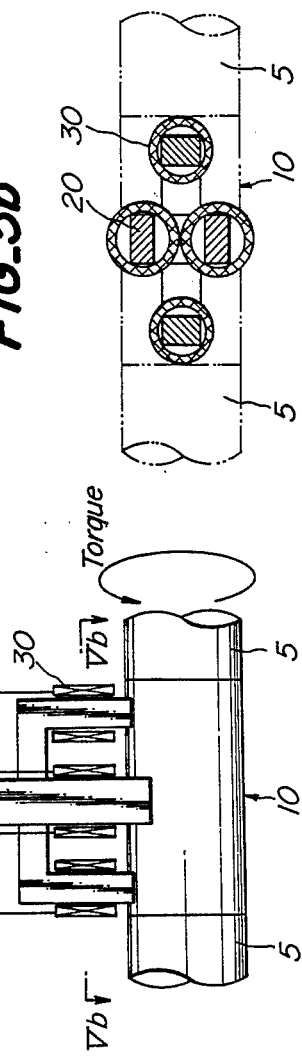

AMORPHOUS METAL-METAL COMPOSITE ARTICLE, A METHOD FOR PRODUCING THE SAME, AND A TORQUE SENSOR USING THE SAME

BACKGROUND OF THE INVENTION

1) Field of the Invention

The present invention relates to an amorphous metal-metal composite article, a method for producing the same, and a torque sensor using the same. More particularly, the present invention relates to an amorphous metal-metal composite article, comprising an ordinary crystallized metal and an amorphous material (hereinafter may be referred to as amorphous), such as amorphous metal or amorphous alloy, which has been produced from its melted state through rapid cooling and has no crystal structure, firmly bonded to the crystallized metal by the explosion pressure of an explosive. The present invention also relates to a method for producing the composite article, and a torque sensor using the same.

Amorphous metal has excellent magnetic properties, and hence attempts have been made to use the metal as various magnetic materials. Particularly, a composite article comprising an amorphous metal and an ordinary metal bonded thereto is very useful as a torque sensor due to the soft magnetic property and high magnetostriction of the amorphous metal.

2) Related Art Statement

Amorphous can be produced by a rapid cooling method or other various methods, such as spatter method, chemical vapor deposit method, plating method and the like. However, the amorphous metals obtained by these methods are thin sheets, fine wires and powders, all of which have a dimension of less than several hundreds μm, and the use field of these amorphous metals is very limited. In order to use amorphous metals in a wide field, amorphous metals having a larger dimension are demanded, and a shaped article produced by the compression molding of amorphous metal powder has been disclosed (Japanese Patent Laid-open Specification No. 61-139,629).

Japanese Patent Laid-open Specification No. 61-195,905 discloses an amorphous-covered metal obtained by a method wherein an amorphous metal powder is bonded to a metal matrix by an explosion pressure; and Japanese Patent Laid-open Specification No. 62-23,905 discloses a method for producing a composite sintered article from an amorphous metal powder and a metal powder by utilizing a high energy shock.

There has been proposed a technic, wherein an amorphous metal thin sheet having a thickness of not larger than 100 μm is bonded to a sheet or round rod of metal by an explosion pressure to produce a composite article having both of the excellent magnetic properties inherent to amorphous metal and the high strength inherent to metal. However, amorphous metal is generally lower in thermal expansion coefficient than ordinary metal. Therefore, when a composite article comprising an amorphous metal and a metal bonded to the amorphous metal through the explosion bonding, which metal is higher in thermal expansion coefficient than the amorphous metal, is heat treated in order to restore the magnetic properties deteriorated due to the residual stress caused in the amorphous metal during the explosion treatment, a compression stress is caused in the amorphous metal during the cooling of the composite article from the heat treatment temperature to room temperature. This compressor stress is due to the reason that the metal bonded to the amorphous metal shrinks more than the amorphous metal bonded with the metal shrinks, and hence magnetic domains extending in a direction perpendicular to the length direction of the composite article are formed, and a satisfactorily excellent magnetic property can not be obtained in the length direction of the composite article. In order to prevent these drawbacks, it is necessary that an amorphous metal and a metal having substantially the same thermal expansion coefficient are bonded to each other so as not to cause a compression stress in the amorphous metal. (Magnetic Society of Japan, 10th Autumn Annual Meeting Preprint No. 4PC-10 (page 61) (1986, 11), Ichiro Sasada et al, "Properties of Torque Sensor produced by the Explosion Bonding Method").

The inventors have attempted to develop a composite article comprising an amorphous metal and substantially any metal bonded thereto and being able to be used as a magnetic sensor, such as a torque sensor or the like, by utilizing the excellent magnetic properties inherent to the amorphous metal, and have studied the above described problems and further made various theoretical and experimental investigations.

In general, amorphous metal causes a structural relaxation by a heat treatment and exhibits improved magnetic properties after a heat treatment as compared with the magnetic properties just after the production. Therefore, amorphous metal is generally used after it has been subjected to a heat treatment. However, when an amorphous metal-metal composite article, wherein the amorphous metal has been very tightly bonded to the metal by the explosion bonding, is subjected to a heat treatment, the magnetic properties inherent to the amorphous metal are often deteriorated without being restored to the original values before the heat treatment.

The above described prior art discloses the methods for solving this problem. However, the prior art has still the following drawbacks and has been difficult to be carried out.

The reason is probably as follows.

(1) When an amorphous metal thin sheet is merely applied with an explosion pressure without bonding to a metal by the explosion, and it is intended to restore the deteriorated magnetostriction of the amorphous metal thin sheet by removing the residual stress, which is caused in the amorphous metal thin sheet by the explosion, by a heat treatment, the deteriorated magnetostriction of the amorphous metal thin sheet can be restored to about 90–100% of its original value by keeping the sheet for several hours at a temperature of 250°–400° C. to remove the residual stress.

(2) However, in the case where a composite article comprising an amorphous metal thin sheet and a metal bonded thereto by the explosion is heat treated, when the length of both the elements of the composite article, after heated up to the heat treatment temperature, is represented by L, the difference between the room temperature and the heat treatment temperature is represented by T, and the thermal expansion coefficients of the amorphous metal and the metal bonded with each other are represented by $\alpha$ and $\alpha'$ respectively, the lengths of the amorphous metal and the metal after cooled to room temperature after completion of the heat treatment can be represented by $L(1-\alpha T)$ and $L(1-\alpha'T)$, respectively.

(3) When the metal bonded to the amorphous metal has a thermal expansion coefficient higher than that of the amorphous metal, $\{L(1-\alpha T)\}$ is larger than $\{L(1-\alpha' T)\}$.

(4) An amorphous metal thin sheet is ordinarily bonded to a metal having a thickness larger than the thickness of the amorphous metal thin sheet, and therefore the amorphous metal thin sheet is compressed by the shrunk metal.

(5) An amorphous metal forms magnetic domains extending in a direction perpendicular to its length direction when it is compressed, and hence the magnetic properties (magnetization) of the amorphous metal in its length direction are noticeably deteriorated, and the composite article can not be practically used.

In order to solve the above described problems, the following means is considered to be effective.

(1) There are used an amorphous metal and a metal having substantially the same linear thermal expansion coefficient.

(2) The heat treated composite article is subjected to a plastic working which can apply a tensile stress to the amorphous metal in an amount sufficient to offset the compression stress caused in the amorphous metal during the heat treatment.

The above described means (1) has drawbacks explained in the following items (a) and (b), and is not suitable to be carried out in a commercial scale.

(a) The means (1) requires merely to select the kind of metals to be bonded to amorphous metal, and is simple. However, in the practical operation, these metals are Zr, Ti, Mo, Ta and their alloys containing other alloy elements, and particular alloys. These metals and alloys have drawbacks that, for example, they are difficult to be obtained, or are insufficient in the strength to be used as a sensor, or are difficult to be bonded to amorphous metal.

(b) When a composite article is to be worked into, for example, a torque sensor, it is necessary that an amorphous metal thin sheet is bonded to a metal round rod, and the resulting composite article is worked into a torque sensor, or that a composite article obtained by bonding an amorphous metal thin sheet to a metal flat sheet is wound round and bonded to a round rod used as a reinforcing member. In the former case, there is a problem that the working is difficult in addition to the defects explained in item (a). In the latter case, it is necessary to carry out the bonding at a temperature, which does not cause crystallization of the amorphous metal. Therefore, it is difficult to carry out the bonding of the composite article to the reinforcing round rod by the welding, press bonding, soldering and the like, in which the amorphous metal is exposed to a high temperature. As an easy method for the bonding, there can be used a mechanical bonding of the composite article to the reinforcing round rod, or an adhesion of the composite article to the reinforcing round rod by means of an adhesive. In the mechanical bonding, a composite article (hereinafter, referred to as sensor) comprising an amorphous metal and a metal bonded thereto is bonded to a round rod (hereinafter referred to as shaft) by means of a mechanical screw, or by a mechanical fitting or the like. In this case, there is a problem that stress is unevenly transmitted from the shaft to the sensor, or other problem. When the sensor is adhered to the shaft by means of an adhesive, there are such problems that the adhesive is only durable in a very narrow range of the environmental conditions, under which the torque sensor is used, and that it is difficult to maintain the adhered state for a long period of time of the use. Moreover, in the case where the flat sheet-shaped sensor is wound round a shaft, it is difficult to bond the flat sheet-shaped sensor to the shaft in a high roundness, and hence when the resulting sensor assembly formed of the sensor and the shaft is used as a torque sensor, the measured values are dispersed due to the following reasons unless a large gap is formed between the sensor and a pick-up used for measuring the variation of magnetic flux, both the members come into contact with each other; the sensitivity of the sensor is deteriorated by the formation of a large gap; and the distance between the pickup and the sensor varies, or other reasons.

Therefore, the inventors considered that the means (2) is a proper means for bonding the sensor to the shaft, and have made various theoretical and experimental investigations with respect to various methods for bonding the sensor to the shaft by considering that the main object of the present invention is the provision of a sensor, such as torque sensor or the like, which utilizes excellent magnetic properties inherent to amorphous metal. As a result, the inventors have accomplished the present invention. That is, according to the present invention, magnetic sensors, such as torque sensor and the like, having excellent magnetic properties and high mechanical accuracy, and hence having high sensitivity at the use and small dispersion in the measured values can be obtained even when an amorphous metal is bonded to a metal having substantially any thermal expansion coefficient.

SUMMARY OF THE INVENTION

One of the features of the present invention is the provision of an amorphous metal-metal composite article, which has been obtained by subjecting a sheet-like composite article, comprising a metal and an amorphous metal bonded thereto by the explosion and having a compression stress in the amorphous metal portion caused therein due to the heat treatment to a plastic working so as to give a tensile stress to the amorphous metal in an amount sufficient to offset the compression stress remaining in the amorphous metal and to restore the magnetostriction of the amorphous metal, and has been fixed to a reinforcing member.

Another feature of the present invention is the provision of an amorphous metal-metal annular composite article bonded to a reinforcing member, an improvement comprising said annular composite article, which has been obtained by bonding an amorphous metal to the outer periphery of an annular metal by the explosion pressure, being heat treated and then bonded to the reinforcing member through fitting so as to give a tensile stress to the amorphous metal in an amount sufficient to offset the compression stress caused in the amorphous metal due to the heat treatment.

BRIEF DESCRIPTION OF THE DRAWINGS

FIG. 1 is an explanative side view illustrating the shape of a flat sheet-shaped composite article according to the present invention before its plastic working;

FIG. 2 is an explosive side view illustrating the shape of the composite article illustrated in FIG. 1 after its plastic working;

FIG. 3 is an explanative side view of a torque sensor according to the present invention, which illustrates the shape of the torque sensor;

FIG. 4 is a front view of the torque sensor illustrated in FIG. 3;

FIG. 5a is a block diagram of an apparatus used for measuring the magnetic properties of an amorphous metal-metal composite article according to the present invention;

FIGS. 5b is a plan view, partly in section of the torque sensor portion in the apparatus illustrated in FIG. 5a along a line Vb—Vb in the arrow direction.

DESCRIPTION OF THE PREFERRED EMBODIMENT

Figure 6:
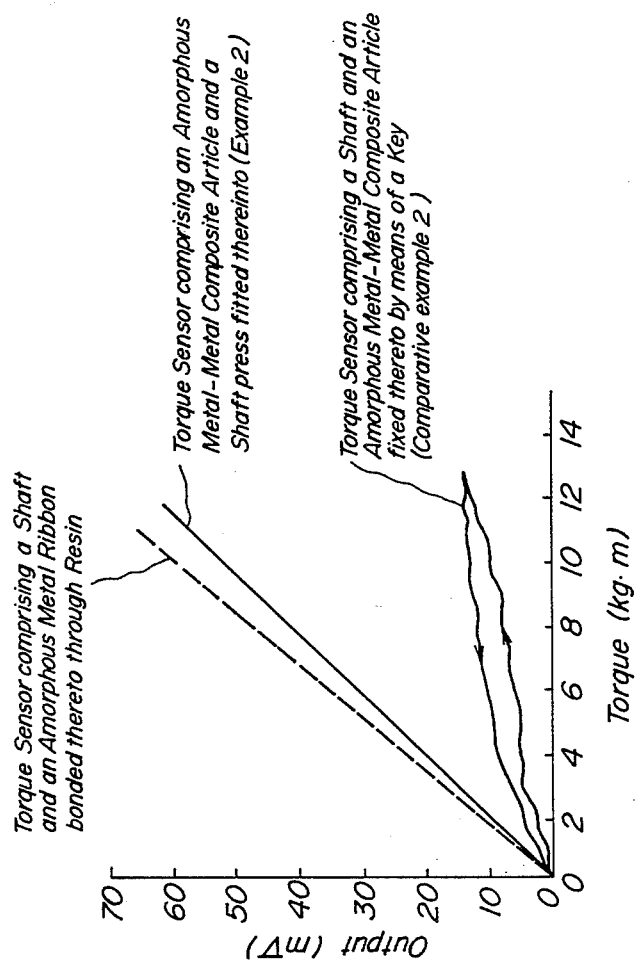
FIG. 6 is a graph illustrating an output voltage-torque property of a torque sensor using an amorphous metal-metal composite article according to the present invention and that of a comparative torque sensor.

One embodiment of the present invention will be explained referring to the drawings.

FIG. 1 illustrates an amorphous metal-metal composite article, after heat treatment, which comprises a metal sheet 1 having a length L and an amorphous metal 2 having the same length as that of the metal sheet 1 and having been bonded to one surface of the metal sheet 1 by the explosion. FIG. 2 illustrates the composite article illustrated in FIG. 1, after having been bent in a radius of curvature of $R_r$ round the neutral axis. In FIG. 2, the numeral 1' represents the bent metal sheet, and the numeral 2' represents the bent amorphous metal. When the thickness of the amorphous metal is represented by $t_1$, the thickness of the metal is represented by $t_2$, and the radius of curvature of the amorphous metal-metal composite article bent round the neutral axis, which is considered to be free from the compression and tension caused by the bending, is represented by R. The radius of curvature $R_a$ of the amorphous metal can be expressed by the following equation:

$$R_a = R_r + (t_1 + t_2)/2 \quad (1)$$

It can be seen from FIG. 2 that the amorphous metal is positioned in a region having a larger curvature, and moreover the amorphous metal has a thickness remarkably smaller than the total thickness of the composite article. Therefore when the thickness of the amorphous metal is ignored, the amorphous metal-metal composite article is plastically deformed, due to the bending, by a stretched amount Δ calculated by the following equation:

$$\Delta = L(t_1 + t_2)/(2R_r) \quad (2)$$

The original length of the composite article is L, and therefore when the distortion rate of the composite article is represented by $\tau$, the following equation is obtained:

$$\tau = \Delta/L = (t_1 + t_2)/(2R_r) \quad (3)$$

In this case, the amount $\sigma_t$ of the tensile stress, which is applied to the amorphous metal during the bending, is given by the following equation:

$$\sigma_1 = E\tau \quad (4)$$

wherein E represents the Young's modulus of the amorphous metal. That is, it is clear that, when an amorphous metal-metal composite article is bent in a proper radius of curvature, an optional tensile stress can be applied to the amorphous metal, and hence the above described compression stress caused in the amorphous metal due to the difference in the thermal expansion coefficient between the amorphous metal and the metal can be offset by the tensile stress. The amount of the compression stress to be offset will be explained later. Moreover, it is clear that the same effect as that described above can be also obtained by a method, wherein an amorphous metal-metal composite article is previously bent prior to a heat treatment such that the amorphous metal will be in the inside of the curved amorphous metal-metal composite article, and then the curved composite article is bent back into the original flat shape after the heat treatment.

Next, as another method for offsetting the compression stress in the present invention, a press fitting method will be explained referring to the accompanying drawings. FIGS. 3 and 4 illustrate a state, wherein a shaft 5 having a smoothly tapered diameter has been press-fitted, along the taper of the shaft, into an annular composite article comprising a metal cylinder 3 and an amorphous metal 4 bonded to the outer periphery of the metal cylinder 3 by the explosion. The term "have been press-fitted" means that the inner diameter of the annular composite article has been enlarged from the original inner diameter due to the press fitting of the shaft 5 into the annular composite article along the taper of the shaft 5.

When the inner radius of the metal cylinder 3 before the press fitting is represented by $R_1$, the inner radius thereof and the outer radius thereof after the press fitting are represented by $R_1'$ and $R_2$ respectively, and the Young's modulus of the metal portion of the metal cylinder 3 is represented by E. The pressure P, which is given to the metal cylinder 3 by the shaft 5 due to the press fitting, can be represent by the following equations:

$$P = E\delta(R_2^2 - (R_1')^2)/(2R_1'R_2^2) \quad (5)$$

and $$\delta = (R_1' - R_1) \quad (6)$$

Further, when the tensile stress caused in the inner diameter portion of the metal cylinder 3 in the peripheral direction by the pressure P caused in the metal cylinder 3 due to its deformation is represented by $\sigma_{t1}$, and the tensile stress caused in the outer diameter portion of the metal cylinder 3, that is, in the amorphous metal portion, in the peripheral direction by the pressure P caused in the metal cylinder 3 due to its deformation is represented by $\sigma_{t2}$, the following equations can be obtained:

$$\sigma_{t1} = P(R_2^2 + (R_1')^2)/(R_2^2 - (R_1')^2) \quad (7)$$

and $$\sigma_{t2} = 2P(R_1')^2/(R_2^2 - (R_1')^2) \quad (8)$$

Strictly speaking, it is necessary to correct the value $\sigma_{t2}$ due to the difference in Young's modulus between the amorphous metal and the metal. However, for example, an amorphous metal consisting mainly of iron, which is used as a proper amorphous metal for torque sensors, has a Young's modulus lower by about 10–20% than that of iron or steel, and therefore an extremely large error is not caused in the value of $\sigma_{t2}$ in the case where an iron alloy is used as a metal to be bonded with an amorphous metal. While, in the use of a metal, for example, copper, which has an extremely different Young's modulus from that of an amorphous metal, when the value of $\sigma_{t2}$ calculated by equation (8) is corrected b multiplying the quotient, which is obtained by dividing the Young's modulus of the amorphous metal by the Young's modulus of copper, to the obtained value of $\sigma_{t2}$, a practically usable value of $\sigma_{t2}$ can be obtained. Further, in the case where it is intended to obtain a more accurate value, when the magnetostriction of the torque sensor is measured and the value of $\sigma_{t2}$, which will result in a desirable magnetic property, is calculated, the calculated value can be used as a practically usable value of $\sigma_{t2}$.

Further, as a simpler calculation method, the following method can be used. When an amorphous metal is stuck to the outer layer of a metal cylinder as in the case of the present invention, said amorphous metal and metal cylinder being different materials from each other, the tensile stress caused in the amorphous metal can be deduced more easily by the following equations:

$$\sigma_{t1} = E(R_1' - R_1)/R_1 \qquad (9)$$

$$\sigma_{t2} = E(R_2' - R_2)/R_2 \qquad (10)$$

and $$R_2' = \{R_2^2 - R_1^2 + (R_1')^2\}^{178} \qquad (11)$$

According to this method, when the Young's modulus of that portion of a material which is to be press-fitted is used, a proper tensile stress to be caused in the portion of the material can be deduced. However, strictly speaking, it is necessary to add such a condition that an amorphous metal thin sheet is tightly bonded to a metal having a Young's modulus different from that of the amorphous metal thin sheet, and in this case the value of tensile stress caused in the amorphous metal is somewhat different from the above calculated value of tensile stress. However, the calculated value is a rough criterion, and it is proper to measure the magnetostriction value and to calculate the value of tensile stress corresponding to the deformed value.

As a further method for carrying out the present invention, there is a shrink fitting method other than the above described press fitting method. The shrink fitting method is a method, wherein a sensor 1 is heated up to a certain temperature to enlarge its inner diameter by the thermal expansion, a shaft 5 kept at room temperature is fitted into the heated sensor during the sensor has an enlarged inner diameter, and he inner diameter of the sensor 1 is made shrink by the cooling of the sensor 1 and to cause a tensile stress in the metal cylinder 3. In this case, the tensile stresses caused in the metal cylinder and in the amorphous metal portion of the composite article can be easily deduced by combining the above described equations (9), (10) and (11) with the following equations:

$$R_1' = R_1 + R_1 \times \alpha(T - T_0) \qquad (12)$$

and $$R_2' = R_2 + R_2 \times \beta(T - T_0) \qquad (13)$$

In the above equations, $\alpha$ and $\beta$ represent linear thermal expansion coefficients of the metal and the amorphous metal respectively, T represents heating temperature, and $T_0$ represents room temperature.

An explanation will be made hereinafter with respect to the generation mechanism of the compression stress in the amorphous metal by the heat treatment of an amorphous metal-metal composite article in the present invention, and the value of the compression stress to be offset in the present invention.

The linear thermal expansion coefficient of the metal portion of a metal cylinder 3 is represented by $\alpha$, that of the amorphous metal portion thereof is represented by $\beta$, and the heat treatment temperature, which is carried out for removing a residual stress caused in the amorphous metal portion by the explosion bonding of the amorphous metal to the metal, is represented by $T_1$. The heat treatment is carried out in order to remove as much as possible the residual stress caused in the amorphous metal portion exposed to a high load during the explosion bonding. Therefore, it can be considered that the metal and the amorphous metal have already been free from a residual stress at the heat treatment temperature. In this case, when the unit length of the metal portion at the heat treatment temperature $T_1$ is represented by $L_{m1}$, the unit length of the amorphous metal pOrtion at the heat treatment temperature $T_1$ is represented by $L_{a1}$. The unit length $L_{m0}$ of the metal portion and the unit length $L_{a0}$ of the amorphous metal pOrtiOn after cooled to room temperature $T_0$ subsequent to the completion of the heat treatment can be calculated by the following equations:

$$L_{m0} = L_{m1}[1 - \alpha(T_1 - T_0)] \qquad (14)$$

and $$L_{a0} = L_{a1}[1 - \beta(T_1 - T_0)] \qquad (15)$$

However, major metals have a linear thermal expansion coefficient $\alpha$ higher than the linear thermal expansion coefficient $\beta$ of amorphous metals. Therefore, in spite of the fact that the metal portion and the amorphous metal portion have originally the same unit length of $L_{m1} = L_{a1}$ at the heat treatment temperature $T_1$, the unit length $L_{a0}$ of the amorphous metal portion should be larger than the unit length $L_{m0}$ of the metal portion after cooled to room temperature $T_0$. However, the amorphous metal thin sheet is considerably smaller in thickness than the metal portion, and therefore the amorphous metal thin sheet does not shrink into a unit length of $L_{a0}$, but is actually shrunk together with the shrinkage of the metal portion into a unit length of $L_{m0}$ after cooled to room temperature $T_0$. That is, the amorphous metal thin sheet lies in a state wherein the sheet has been compressed in a compressibility of $(L_{a0} - L_{m0})/L_{a0}$. The compression stress $\sigma_c$ caused in the amorphous metal thin sheet by the compression can be calculated as follows by the following equation:

$$\sigma_c = E_a(L_{a0} - L_{m0})/L_{a0} = E_a[1 - \{1 - \alpha(T_1 - T_0)\}/\{1 - \beta(T_1 - T_0)\}] \qquad (16)$$

Accordingly, the compression stress caused in the amorphous metal can be offset by subjecting the composite article to a plastic working, such as bending, press fitting or shrink fitting, under a condition that a tensile stress, the value $\sigma_t$ of which is equal to the value $\sigma_c$ of the above described compression stress, is applied to the amorphous metal. The dimension of curvature or that of interference required for obtaining a proper value of $\sigma_t$ in the plastic working can be easily calculated according to equations (1)–(13).

In the above described calculation, it is necessary to take care that both the amorphous metal and the metal are not only elastically deformed but also plastically deformed in the case where they are deformed in an extremely large amount by the compression or stretching. In this case, a proper value of compression stress or tensile stress, which can offset tensile stress or compression stress, can not be obtained by merely calculating the value of these stresses proportionally to the Young's modulus. However, the calculation of a proper value of these stresses in such a case is described in the ordinary text book of the strength of materials, and those skilled in the art can calculate a proper value.

In the present invention, not only the bending, press fitting or shrink fitting alone, but also a combination thereof can be carried out insofar as the aimed amount to be deformed can be obtained. That is, the magnetic properties can be restored to the original value by the deformation. The bending has been explained in this specification with respect to a simple one-direction bending. However, in the present invention, a bulge working which can attain the same effect as the effect attained by the one-direction bending, can be carried out. Those skilled in the art can calculate easily the working amount, which can give a necessary amount of tensile stress to the amorphous metal, referring to the above described disclosure and to a text book concerning the plastic working.

The present invention has solved the following drawbacks. That is, when an amorphous metal is bonded to a metal, which has a linear thermal expansion coefficient higher than that of the amorphous metal, through the explosion bonding to produce a composite article and the residual stress caused in the amorphous metal in the resulting composite article during the explosion bonding is removed by a heat treatment and then the composite article is cooled to room temperature, the metal shrinks in an amount larger than the shrinking amount of the amorphous metal. Hence the compression stress remains in the amorphous metal and causes the deterioration of the magnetic properties of the amorphous metal. According to the present invention, the deterioration of the magnetic properties of the amorphous metal in the composite article can be prevented by a method, wherein the heat treated composite article is subjected to a plastic working, such as bending, press fitting or shrink fitting, to apply a tensile stress to the amorphous metal in an amount sufficient to offset the compression stress caused in the amorphous metal during the cooling subsequent to the heat treatment, whereby a magnetic sensor, such as torque sensor or the like, having excellent magnetic properties inherent to the amorphous metal can be obtained. It has hitherto been substantially impossible to produce a magnetic sensor, such as torque sensor or the like, by bonding an amorphous metal to a metal having a thermal expansion coefficient different from that of the amorphous metal, due to the above described mechanism. While, according to the present invention, a magnetic sensor can be produced even when an amorphous metal is bonded to substantially any metal. Therefore, the present invention provides an excellent technic. The term "substantially any metal" herein used means iron, steel and alloys consisting mainly of iron; copper and copper alloys, aluminum and aluminum alloys, which are ordinarily used as an industrial material, and further means substantially all kinds of metals, which can be used as a reinforcing member.

The merit of the amorphous metal-metal composite article of the present invention and the production method thereof lies in that a magnetic sensor, such as torque sensor or the like, having excellent magnetic properties can be obtained even when an amorphous metal is bonded to a metal having substantially any linear thermal expansion coefficient. Particularly, the fact that a magnetic sensor can be produced by bonding an amorphous metal to an ordinary metal has such merits that the resulting magnetic sensor is superior to a conventional magnetic sensor in the linearity of the output power to torque, that the magnetic sensor is substantially negligible in the variation of the output power with the lapse of time, and that an optional material having a property demanded to a reinforcing member can be used in the metal portion of the magnetic sensor.

The following examples are given for the purpose of illustration of this invention and are not intended as limitations thereof.

EXAMPLE 1

An amorphous metal thin sheet of 20 mm width ×70 mm length ×25 μm thickness having a composition of $Fe_{78}B_{13}Si_9$ (atomic ratio) was superposed on substantially the center portion of that surface of a Cu sheet of 80 mm width ×100 mm length ×2 mm thickness which had previously been adjusted to a surface rOughness of 3.2 Ra with a #60 sandpaper by a hand working. A black rubber sheet having the same plane dimension as that of the Cu sheet and having a thickness of 2 mm was superposed on that surface of the amorphous metal thin sheet which was opposite to the surface faced to the Cu sheet such that the edges of both the members were agreed to each other. Further, a cold rolled steel sheet having the same plane dimension as that of the Cu sheet and having a thickness of 1 mm was superposed on that surface of the black rubber sheet which was opposite to the surface faced to the amorphous metal thin sheet such that the edges of both the members were matched to each other. A commercially available polyvinyl chloride insulating tape was wound round the above obtained combination (hereinafter, referred to as assembly) consisting of Cu sheet-amorphous metal thin sheet-black rubber sheet-cold rolled steel sheet, superposed upwardly from the bottom, under tension such that the edge of the tape of a turn was contacted with the edge of the next turn, whereby the whole surface of the assembly was covered with one layer of the tape.

An explosive of 100 mm width ×140 mm length ×5 mm thickness having a density of 1.4 g/m$^3$ and having an explosion velocity of 5.5 km/sec was arranged on the upper surface on the cold rolled steel sheet side of the assembly, which had been covered with the tape, such that the explosive was projected from the assembly by 10 mm in three edges to form 3 marginal explosive areas having a width of 10 mm and by 30 mm in one edge to form one marginal explosive area having a width of 30 mm, and then the superposed mass of the explosive and the assembly were adhered to each other by means of a synthetic rubber adhesive such that a clearance was not formed between the explosive and the tape covering the assembly. Then, a No. 6 electric detonator was arranged on the center of the side of the marginal explosive area having a width of 30 mm, and the resulting mass was placed on substantially the center portion of a steel pedestal of 300 mm square having a thickness of 30 mm, which had been placed on the earth, and an electric current was applied to the electric detonator to detonate the explosive.

In the recovered assembly, the cold rolled steel sheet and the black rubber sheet had been flown away, but the amorphous metal thin sheet and the Cu sheet were firmly bonded to each other, and there were observed none of the stain, breakage and wave-shaped deformation on the surface of the amorphous metal thin sheet. However, on that surface of the Cu sheet which was bonded to the amorphous metal thin sheet, there was observed soot-like stain, which had probably been formed by the decomposition of the black rubber sheet, on the amorphous metal portion and on the exposed Cu sheet portion. However, this stain was able to be easily removed by wiping it with a solvent.

A part of the bonding portion of the amorphous metal thin sheet and the Cu sheet was cut out by means of a precision cutter while cooling, and then an area ranging from the amorphous metal portion to the bonding interface portion was sliced by means of an ion milling apparatus to prepare a test piece for transmission electron microscope (TEM) observation. The area ranging from the amorphous metal thin sheet to the bonding interface portion was subjected to minute high resolution image observation and electron diffractiometry by means of the TEM. As a result, a crystallized area was observed in the amorphous metal portion in the vicinity of the bonding interface. However, it was confirmed that the crystallization of the amorphous metal did not occur in the portion apart from the amorphous metal-Cu interface by 2.4 μm or more.

The above obtained amorphous metal-Cu composite article was bent in a radius of curvature of 260 mm in the length direction of the composite article sheet such that that side of the amorphous metal which was bonded to the Cu sheet would be positioned inside the curved surface, and the bent composite article sheet was subjected to such a heat treatment that the composite article sheet was heated from room temperature to 400° C. in 1 hour, kept at 400° C. for 2 hours and then cooled to room temperature in a furnace. When the linear thermal expansion coefficient of industrial grade pure copper was assumed to be about $17.8 \times 10^{-6}$/° C., that of the amorphous metal was assumed to be $7.6 \times 10^{-6}$/° C., and the Young's modulus of the amorphous metal was assumed to be $1.4 \times 10^4$ kgf/mm², the compression stress caused in the amorphous metal due to the heat treatment was calculated to be 46.5 kgf/mm² from equation (16). Separately, the above described composite article sheet, which had been bent but had not yet been subjected to the heat treatment, was bent back in a direction reverse to the originally bent direction until the bent composite article sheet was formed into a flat sheet under care not to cause a local working in the composite article. When the tensile stress caused in the amorphous metal by this flattening working was calculated by equations (3) and (4), the value of a tensile stress of 48.0 kgf/mm² was obtained. That is, it has been clarified that the compression stress caused in the amorphous metal due to the heat treatment has been offset in the bending direction as far as the computation goes, and a tensile stress of 1.5 kgf/mm² has been loaded to the amorphous metal after deduction of the compression stress.

When the magnetic properties in the length direction of this composite article and those in the length direction of an $Fe_{78}B_{13}Si_9$ amorphous metal ribbon having the same dimension as that of the above described composite article were measured by means of a direct current B-H magnetic property measuring apparatus, the permeability of the amorphous metal in the composite article was 89% based on the permeability of the amorphous metal ribbon single body. Further, the amorphous metal in the composite article had a coercive force 1.5 times that of the amorphous metal ribbon single body. Therefore, the amorphous metal in the composite article subjected to the above described working had substantially the same magnetic properties as those of the amorphous metal ribbon single body.

Further, the same amorphous metal-Cu composite article as the above described amorphous metal-Cu composite article was produced according to the above described explosion method, and an amorphous metal-Cu composite article sheet of 90 mm length × about 63 mm width was cut out from the composite article such that the amorphous metal bonded to Cu in the composite article would b positioned in substantially the center of the length direction of the cut out composite article sheet, that a pair of both ends of the amorphous metal would be contacted to both the longer sides of the cut out composite article sheet, and that the sides of another pair of both ends of the amorphous metal would extend in a direction perpendicular to the longer side of the cut out composite article sheet. The cut out composite article sheet was then formed into a substantially cylindrical shape such that the shorter sides of the cut out composite article sheet would form the ends of the curved surface. The resulting substantially cylindrically curved sheet was then formed into a cylindrical shape by the drawing method, in which the longer sides of the composite article sheet were apart from each other by about 2.5 mm and that surface of the sheet, on which the amorphous metal was arranged, was present on the outer peripheral side of the cylindrical composite article sheet. The resulting cylindrical composite article sheet was heat treated by the above described heat treating method. The heat treated cylindrical amorphous metal-Cu composite article sheet was placed at the center portion of an SUS 304 stainless steel round rod having a dimension of 200 mm length × 16.0 mm diameter, and the surface of the composite article was protected by means of a polyvinyl chloride adhesive tape. A copper wire having a diameter of about 1 mm then wound around the cylindrical composite article so as to contact both sides, which had been separated from each other, of the cylindrical composite article sheet with each other and further to contact substantially the cylindrical composite article sheet to the stainless steel round rod. The resulting mass was placed horizontally, and both ends of the cylindrical composite article sheet were soldered to the SUS 304 stainless steel round rod along its entire periphery by a silver solder having a liquid phase line temperature of 450° C.

The compression stress caused in the amorphous metal due to the heat treatment is 46.5 kgf/mm², and it is calculated from equations (1)–(4) that a tensile stress of 51.3 kgf/mm² has been caused in the amorphous metal by subjecting the cylindrical composite article sheet, whose both sides are apart from each other by 2.5 mm, to a cold working so as to contact the sides apart from each other. As the result, it is calculated that 4.8 kgf/mm² of tensile stress has been loaded to the amorphous metal after deduction.

When the magnetic properties of the above obtained torque sensor by the silver soldering of the composite article to the SUS 304 stainless steel shaft and that of a torque sensor produced by adhering an amorphous metal ribbon, which was the same in composition as that of the amorphous metal used in the composite article, to the SUS 304 stainless steel shaft by resin were measured by means of an apparatus illustrated in FIGS. 5a and 5b, it was found that the torque sensor obtained by silver soldering the amorphous metal-Cu composite article to the SUS 304 stainless steel shaft had a sensitivity of 81% based on the sensitivity of the torque sensor obtained by adhering the amorphous metal ribbon to the SUS 304 stainless steel shaft by resin, and had a high linearity of output voltage to torque similarly to the linearity in the torque sensor produced by adhering the amorphous metal ribbon to the SUS 304 stainless steel shaft by resin, and had substantially no hysteresis in the linearity.

In FIGS. 5a and 5b, the numeral 5 represents a shaft, the numeral 10 represents an amorphous metal magnetic material, the numeral 15 represents an ammeter, the numeral 20 represents a detection coil, and the numeral 30 represents an exciting coil.

COMPARATIVE EXAMPLE 1

The experiment of Example 1 was repeated, except that the bending prior to the heat treatment and the plastic working after the heat treatment were not carried out. When the magnetic properties of the heat treated amorphous metal in the composite article were measured in the same manner as described in Example 1, it was found that the amorphous metal in the composite article had a low permeability of 22% based on the permeability of the amorphous metal ribbon single body and had a coercive force as high as 12.0 times that of the amorphous metal ribbon single body. That is, the magnetic properties of the amorphous metal in the composite article, which had not been subjected to plastic working, were not able to be restored at all by the heat treatment only, and were very low values. Accordingly, it is clear that the amorphous metal-metal composite article of the present invention, which is obtained by heat treating an amorphous metal-metal composite article, said composite article having been produced by the explosion bonding of an amorphous metal to a metal, and then subjecting the heat treated composite article to a plastic working in order to give a tensile stress to the amorphous metal in an amount sufficient to offset the compression stress caused in the amorphous metal due to the heat treatment, is superior to a composite article obtained by merely bonding an amorphous metal to a metal by the explosion.

EXAMPLE 2

The outer peripheral surface of an SUS 304 stainless steel round rod having a length of 200 mm and a diameter of 22 mm was worked by a lathe to adjust its surface roughness to 2.1 Ra, and an amorphous metal thin sheet having a width of 50 mm and a thickness of 28 μm was wound round by one turn the center portion in the longitudinal direction of the above treated SUS 304 stainless steel round rod such that the turn ends of the wound amorphous metal thin sheet would be face to face with each other without a gap, and a polyvinyl chloride tape was wound round the wound amorphous metal thin sheet under tension such that the edge of the polyvinyl chloride tape in a turn was contacted to the edge in the next turn of the tape, whereby the amorphous metal thin sheet was fixed to the stainless steel round rod. In this case, the polyvinyl chloride tape was wound round so as to cover not only the peripheral surface of the amorphous metal thin sheet, but also the whole peripheral surface of the stainless steel round rod. The amorphous metal thin sheet had a composition of $Fe_{67}Co_{18}B_{14}Si_1$ (atomic ratio). A black rubber sheet having a width of 200 mm and a thickness of 2 mm was wound round by one turn the outside of the polyvinyl chloride tape such that both the turn ends of the black rubber sheet would be face to face with each other without a gap, and then the rubber sheet was fixed by means of a synthetic rubber adhesive. Then, the above obtained mass was covered with a copper tube having a length of 200 mm, an outer diameter of 30 mm and a thickness of 1.5 mm such that both the ends of the copper tube were matched to both ends of the stainless steel round rod, and both the end portions of the resulting assembly were sealed with a polyvinyl chloride tape. The resulting assembly was embedded in a cylindrical explosive having a length of 280 mm and a diameter of 70 mm such that both the center axis of the cylindrical explosive and that of the assembly were matched to each other and that one end of the assembly was 20 m inside from one end of the explosive and the other end of the assembly was 60 mm inside from the other end of the explosive. The above used explosive had an explosion velocity of 5.9 km/sec and a specific gravity of 1.3.

When a No. 6 electric detonator was arranged at the center portion of that side of the explosive which is a marginal portion having a width of 60 mm from the end of the assembly, and detonated, the assembly was recovered in the form of substantially the original shape. However, the outer diameter of the copper tube arranged in the outermost periphery was shrunk to about 26 mm in average. When the copper tube was cut and removed by means of a cutting grinding wheel, it was observed that the amorphous metal thin sheet and the stainless steel round rod were firmly bonded to each other, and there were neither surface stain which was not able to be cleaned, nor wave-shaped deformation, nor breakage of amorphous metal, nor poorly bonded portions.

A part of the bonding portion of the amorphous metal thin sheet and the SUS 304 stainless steel round rod was cut out by means of a precision cutter while cooling, and then an area ranging from the amorphous metal portion to the bonding interface portion was sliced by means of an ion milling apparatus to prepare a test piece for transmission electron microscope (TEM) observation. The area ranging from the amorphous metal thin sheet to the bonding interface portion was subjected to minute high resolution image observation and electron diffractiometry by means of the TEM. As the result, a crystallized area was observed in the amorphous metal portion in the vicinity of the bonding interface. However, it was confirmed that the crystallization of the amorphous metal did not occur in the portion apart from the amorphous metal-SUS interface by 1.9 μm or more.

A cylindrical test piece having a length of 15 mm was cut out from the center portion of the above obtained composite article formed of the amorphous metal thin sheet and the SUS 304 stainless steel round rod bonded thereto, by cutting the composite article in a direction perpendicular to the axis of the round rod, and a hole having a diameter of 15 mm was bored by means of a drill at the center portion of the cylindrical test piece. Then, the test piece was heated from room temperature up to 320° C. in 1 hour, kept at 320° C. for 2 hours, and then cooled to room temperature in a furnace. The hole of the above treated test piece was further bored by means of a lathe so as to form a tapered hole having a diameter of 17.7 mm at one end and a diameter of 18.0 mm at the other end, whereby a magnetic material sensor part was produced. The wall of the tapered hole was inclined at an angle of about 0.5° with respect to the center axis. Separately, an SUS 304 stainless steel round rod having an outer diameter of 20 mm was worked at its outer diameter to form a tapered shaft having a diameter of 16.0 mm at one end and a diameter of 19.5 mm at the other end and having an edge inclined at an angle of about 0.5° with respect to its center axis. The resulting shaft was first inserted into the hole of the above obtained magnetic material sensor part without applying a pressure to the shaft until the shaft moved no more, and further pressed into the hole in a distance of 6 mm from the stopped position of the shaft by means of an oil press. The inner diameter of the magnetic material sensor part was enlarged by 0.1 mm by this press fitting of the shaft into the hole of the sensor part.

When the compression stress caused in the amorphous metal due to the above described heat treatment and the tensile stress caused in the amorphous metal due to the press fitting are calculated, the following results are obtained. The linear thermal expansion coefficient of the amorphous metal is $8.6 \times 10^{-6}/°C$ and that of the SUS 304 stainless steel is $18.7 \times 10^{-6}/°C$. Therefore, when the room temperature is assumed to be 20° C., and the Young's modulus of the amorphous metal is assumed to be $1.2 \times 10^{4}$ kgf/mm$^2$, the compression stress $\sigma_c$ caused in the amorphous metal is calculated to be 36.6 kgf/mm$^2$ from equation (16). The outer diameter of the amorphous metal, after changed by the press fitting of the shaft thereinto, is calculated to be 22.08 mm from equation (11), and the tensile stress caused in the amorphous metal by the press fitting of the shaft thereinto is calculated to be 44.1 kgf/mm$^2$ from equation (10). Therefore, it can be understood that the compression stress caused in the amorphous metal due to the shrinkage less than that of the metal in the cooling after the heat treatment has been substantially offset.

The magnetic properties of the torque sensor produced by press fitting the SUS 304 stainless steel shaft into the amorphous metal-SUS 304 stainless steel composite article were measured by means of an apparatus illustrated in FIGS. 5a and 5b. The output voltage-torque property of the torque sensor is illustrated in FIG. 6. The torque sensor produced by press fitting the stainless steel shaft into the composite article has a sensitivity (inclination of the line indicating the output voltage-torque property in FIG. 6) of 88% based on the sensitivity of the torque sensor produced by adhering an amorphous metal having the same composition as that of the amorphous metal used in the composite article to the SUS 304 stainless steel shaft by means of a resin, and further has a high linearity in the relation between the output voltage and the torque within a deviation of 1% similarly to that in the torque sensor produced by adhering the amorphous metal ribbon to the shaft by means of a resin, and has no hysteresis in the linearity of the relation between the output voltage and the torque. Further, in the torque sensor using the amorphous metal ribbon adhered to the SUS 304 stainless steel shaft, the transmission rate of the torque from the shaft matrix (SUS 304 stainless steel) to the amorphous metal was 83%; on the contrary, in the torque sensor using the amorphous metal-SUS 304 stainless steel composite article, into which the SUS 304 stainless steel shaft had been press-fitted, the transmission rate of the torque from the shaft matrix to the amorphous metal was as high as 90%.

COMPARATIVE EXAMPLE 2

The experiment of Example 2 was repeated, except for the following. A hole having a diameter of 15 mm was bored in the center of a cylindrical test piece having a length of 15 cm by means of a drill, which test piece had been cut out from the round rod by cutting the round rod in a direction perpendicular to the axis of the round rod, and the diameter was merely enlarged to 16.0 mm by means of a reamer. A shaft was produced by working an SUS 304 stainless steel round rod into an outer diameter of 16.0 mm by means of a lathe. After the heat treatment, the shaft was inserted into the sensor part up to the center of the shaft, and an SUS 304 stainless steel key having a width of 3 mm, a height of 4 mm and a length of 15 mm was forced into the grooves formed on both of the inner surface of the sensor part and the outer periphery of the shaft, each having a width of 3 mm and a depth of 2 mm, to fix the sensor part to the shaft, and then the same test as described in Example 2 was carried out.

The output voltage-torque property of the resulting torque sensor is illustrated in FIG. 6. As seen from FIG. 6, the resulting torque sensor, which has been produced by fixing the composite article to the shaft by means of the key, has a low sensitivity of about 25% based on the sensitivity of the torque sensor produced by adhering the amorphous metal ribbon to the SUS 304 stainless steel shaft by resin, and is poor in the linearity of the output voltage to torque, and further is large in the hysteresis of the output voltage to torque. Therefore, the torque sensor produced by fixing the composite article to the SUS 304 stainless steel round rod by means of the key is not satisfactory to be used as a torque sensor.

It is clear from the comparison of Comparative example 2 with Example 2 that the reason why a torque sensor having excellent magnetic properties was not able to be obtained in Comparative example 2 is due to the compression stress which has been caused in the amorphous metal due to the heat treatment and remains therein.

EXAMPLE 3

The experiment of Example 2 was repeated under the same condition as described in Example 2, except that an amorphous metal thin sheet having a composition of $Fe_{81}B_{13.5}Si_{3.5}C_2$ (atomic ratio) was used, and the thickness thereof was varied to 30 μm; and further an industrial grade pure copper round rod was used in place of the SUS 304 stainless steel round rod. After bonding, the crystallized state of the amorphous metal at the portion contacted to the bonding interface between the amorphous metal and copper was measured in the same method as described in Example 2, and it was confirmed that the amorphous metal was not crystallized in the portion apart from the bonding interface by 2.3 μm or more.

A cylindrical test piece having a length of 15 mm was then cut out from the center portion of the resulting composite article comprising the amorphous metal thin sheet and the industrial grade copper round rod bonded thereto by cutting the composite article in a direction perpendicular to the axis of the round rod, and a hole having a diameter of 15 mm was bored by means of a drill at the center portion of the cylindrical test piece.

The test piece was then heated from room temperature up to 300° C. in 1 hour, kept at 300° C. for 2 hours, and then gradually cooled to room temperature in 2 hours. The above treated test piece was worked into a sensor part having the same shape as that of the sensor part produced in Example 2. Separately, a shaft which was same in the material and shape as the shaft used in Example 2 was produced and was fixed to the above obtained sensor part in the following manner. The shaft was first inserted into the hole of the sensor part without applying a pressure to the shaft until the shaft moves no more, and further was pressed into the hole in a distance of 5 mm from the stopped position of the shaft by means of an oil press. The inner diameter of the sensor part was enlarged by about 0.14 mm by this press fitting.

When the compression stress caused in the amorphous metal due to the above described heat treatment and the tensile stress caused in the amorphous metal due to the press fitting are calculated, the following results are obtained. The linear thermal expansion coefficient of the amorphous metal is $5.9 \times 10^{-6}/°$ C. and that of the industrial grade pure copper is about $17.8 \times 10^{-6}/°$ C. within the temperature range of from 20° to 300° C. Therefore, when the room temperature is assumed to be 20° C., and the Young's modulus of the amorphous metal is assumed to be $1.7 \times 10^4$ kgf/mm², the compression stress $\sigma_c$ caused in the amorphous metal is calculated to be 56.6 k9f mm² from equation (16). The outer diameter of the amorphous metal, after changed by the press fitting of the shaft thereinto, is calculated to be 22.07 mm from equation (11), and the tensile stress caused in the amorphous metal by the press fitting of the shaft into the amorphous metal is calculated to be 54.8 kgf/mm² from equation (10). Therefore, it can be understood that the compression stress caused in the amorphous metal due to the less shrinkage of the amorphous metal than that of the metal during the cooling after the heat treatment has been substantially offset.

The magnetic properties of the torque sensor obtained by press fitting the shaft into the composite article were measured in the same manner as descried in Example 2. As the result, it was found that the resulting torque sensor had a sensitivity of 82% based on the sensitivity of a torque sensor produced by adhering an $Fe_{81}B_{13.5}Si_{3.5}C_2$ amorphous metal ribbon to the shaft by resin and had a high sensitivity and a low hysteresis in the relation between the output voltage and the torque, which were same as those of the torque sensor produced by adhering the $Fe_{81}B_{13.5}Si_{3.5}C_2$ amorphous metal ribbon to the shaft by resin, and further had a high torque transmission rate of 89%.

COMPARATIVE EXAMPLE 3

The experiment of Example 3 was repeated, except that the shapes of the sensor part and the shaft and the fixing method of the sensor part to the shaft were the same as those in Comparative example 2.

The resulting torque sensor was very poor in the sensitivity similarly to the torque sensor obtained in Comparative example 2, and was not suitable to be used as a torque sensor.

It is clear from the comparison of Comparative example 3 with Example 3 that the reason why a torque sensor having excellent magnetic properties was not able to be obtained in Comparative example 3 is due to the compression stress which has been caused in the amorphous metal due to the heat treatment and remains therein.

EXAMPLE 4

The experiment of Example 2 was effected under a condition that a sensor part and a shaft, both having the same shapes as those described in Example 2, were used, an amorphous metal having a composition of $Fe_{78}B_{13}Si_9$ (atomic ratio) was used, and an S45C carbon steel (JIS) was used as the shaft.

Moreover, in this Example 4, in place of the procedure in Examples 2 and 3, wherein a sensor part is cooled to room temperature after completion of the heat treatment and then a shaft is press-fitted into the sensor part, the following procedure was effected. That is, a sensor part was heated up to 400° C. in 1 hour, kept at 400° C. for 2 hours and cooled to 250° C. in a furnace, and then taken out from the furnace while the sensor part was kept to 250° C. Immediately after the sensor part was taken out from the furnace, a shaft was inserted into the sensor part along the taper of the shaft without applying a pressure to the shaft until the shaft did not enter any more, and then the assembly was left to stand to be cooled. In this case, although the inner and outer diameters of the sensor part shrink due to the cooling, the shrinkage is disturbed by the shaft, and hence it can be assumed that the sensor part is cooled to room temperature while keeping its inner and outer diameters to those at a temperature of 250° C. as such. Strictly speaking, the inner and outer diameters of the sensor part cooled to room temperature are somewhat different from those at 250° C. However, this difference does not cause a problem in the above described assumption in the practical operation of the present invention. Under the above described assumption, when the unit length at 250° C. of the amorphous metal portion is represented by $L_{250}$, and that at 20° C. of the amorphous metal portion is represented by $L_{20}$, the relation between $L_{250}$ and $L_{20}$ is represented by the following equation:

$$L_{20}=L_{250}\{1-\beta(250° C.-20° C.)\} \quad (17)$$

In the above equation, $\beta$ represents the linear thermal expansion coefficient of the amorphous metal.

The amorphous metal should have shrunk to the length of $L_{20}$ due to the cooling, but is forcedly kept to the length of $L_{250}$ by the above described shrink fitting. Therefore, it can be considered that the amorphous metal have been elongated from $L_{20}$ to $L_{250}$ by giving an outer force to the amorphous metal. That is, the amorphous metal is always loaded with a tensile stress corresponding to the outer force. The tensile stress $\sigma_{t3}$ is represented by the following equation:

$$\sigma_{t3}=E_a\beta(250° C.-20° C.) \quad (18)$$

It is known that the linear thermal expansion coefficient of amorphous metal is $7.6 \times 10^{-6}/°$ C., and therefore when it is supposed that the Young's modulus of the amorphous metal is $1.2 \times 10^4$ kgf/mm², the tensile stress $\sigma_c$ caused in the amorphous metal can be calculated to be 21.0 kgf mm² from equation (18). In this case, it is necessary to take care of the fact that a certain compression stress might have already been caused in the amorphous metal during the course of cooling from 400° C. to 250° C. in the furnace due to the difference in the linear thermal expansion coefficient between the amorphous metal and the SUS 304 stainless steel. It is very difficult to calculate strictly the value, because, it is difficult to find out the temperature at which the amorphous metal begins to be applied with a compression stress during the course of the cooling due to the difference in the linear thermal expansion coefficient between the amorphous metal and the SUS 304 stainless steel. When it is intended to find out exactly the temperature, it is necessary that the composite article is heated at various temperatures and the compression stress remaining in the amorphous metal after cooled to a certain temperature is measured at every heating temperatures. However, the object of the present invention does not lie in the measurement of the compression stress remaining in the amorphous metal due to the heat treatment, but lies in the production of a composite article having excellent magnetic properties. Therefore, those skilled in the art can produce easily a composite article having excellent magnetic properties referring to the working examples in the present invention. When it is supposed that an amorphous metal is applied with a compression stress due to the cooling from 400° C. to 250° C. in accordance with the calculated value due to the difference in the thermal expansion coefficient between the amorphous metal and SUS 304 stainless steel, the compression stress is calculated to be 20.0 kgf mm$^2$ Therefore, it is calculated that a tensile stress of 1.0 kgf/mm$^2$ has been applied to the amorphous metal after deduction.

When the magnetic properties of the torque sensor produced by shrink fitting the shaft to the composite article was measured in the same method (FIGS. 5a and 5b) as described in Example 1, it was found that the torque sensor had a sensitivity of 84% based on the sensitivity of a torque sensor produced by adhering an amorphous metal ribbon having the same composition as that of the amorphous metal used in the composite article to the shaft by resin, and had a high linearity within 1% in the output voltage to torque and substantially no hysteresis in the output voltage to torque. Further, the torque transmission rate from the shaft matrix to the amorphous metal was 92%.

COMPARATIVE EXAMPLE 4

The experiment of Example 4 was repeated. However, in this Comparative example 4, a shaft was not shrink fitted into a sensor part at 250° C. after the sensor part had been cooled to 250° C. subsequent to the heat treatment, but was inserted into the sensor part along the taper of the shaft until the shaft did not enter any more without applying a pressure after the sensor part had been cooled to room temperature in a furnace in 2 hours, and then the shaft was fixed to the sensor part in the same method as described in Comparative example 2.

The resulting torque sensor had such poor magnetic properties that the sensitivity was low, and the linearity in the output voltage to torque was poor, and hence the torque sensor was not able to be used as a torque sensor.

It is clear from the comparison of Comparative example 4 with Example 4 that the reason why excellent magnetic properties are not able to be obtained in Comparative example 4 is due to the compression stress which has been caused in the amorphous metal due to the heat treatment and remains therein.

When the value of compression stress remaining in the amorphous metal was calculated according to equation (16), the value of 50.6 kgf/mm$^2$ was obtained.

It can be seen from the results of the above described Examples that, when a composite article comprising a metal and an amorphous metal tightly bonded thereto by the explosion is heat treated and then subjected to a proper plastic working, the residual stress introduced in the amorphous metal by the explosion pressure and the compression stress caused in the amorphous metal due to the difference in the thermal expansion coefficient between the amorphous metal and the metal and remaining in the amorphous metal can be removed, and hence the magnetic properties inherent to the amorphous metal can be restored to substantially the same level before the explosion bonding of the amorphous metal to the metal, and a torque sensor having excellent magnetic properties can be obtained by the use of the composite article. In this case, among the residual compression stresses caused in the amorphous metal due to the heat treatment, the residual compression stress in the peripheral direction of the shaft is predominantly offset by the plastic working, and therefore when the residual stress and residual strain in at least one direction in the amorphous metal can be removed, a torque sensor having excellent magnetic properties capable of being used as a torque sensor can be obtained.

What is claimed is:

1. An amorphous metal-metal composite body fixed to a reinforcing member, said composite body comprising:
    a metal member; and
    an amorphous metal bonded to said metal member by explosion bonding;
said composite body being subjected to a treatment comprising:
    (a) heating the explosion bonded composite body to remove a residual stress in the amorphous metal resulting from the explosion bonding;
    (b) subjecting the heated composite body to plastic working to impose a tensile stress upon the amorphous metal; and
    (c) cooling the composite body, whereby a compression stress inherently occurs in the amorphous metal;
wherein said tensile stress is sufficient to offset the compression stress in the amorphous metal and to restore the magnetostriction of the amorphous metal.

2. The composite body of claim 1, wherein the metal member has a thermal expansion coefficient which is greater than that of the amorphous metal.

3. An annular amorphous metal-metal composite body fixed to a reinforcing member, said composite body comprising:
    an annular metal member; and
    an amorphous metal bonded to an outer periphery of the annular metal member by explosion bonding;
said composite body being heat treated to remove a residual stress in the amorphous metal resulting from said explosion bonding;
wherein said heat treated composite body is fixed to said reinforcing member through fitting, such that a tensile stress is imposed upon the amorphous metal in an amount sufficient to offset a compression stress which inherently occurs in the amorphous metal during cooling after the heat treatment.

4. The annular composite body of claim 3, wherein the annular metal member has a thermal expansion coefficient which is greater than that of the amorphous metal.

5. The annular composite body of claim 3, wherein said reinforcing member consists of a round rod having a tapered outer diameter, and said reinforcing member is press fitted into said heat treated annular composite body.

6. The annular composite body of claim 3, wherein said reinforcing member is shrink fitted into said heat treated annular composite body while the composite body is maintained at a shrink fitting temperature lower than the heat treatment temperature, and while the reinforcing member is maintained at a temperature lower than said shrink fitting temperature, such that upon cooling after the heat treatment, said tensile stress is imposed upon the amorphous metal.

7. An assembly comprising:
an annular composite body comprising a non-magnetic metal member and a magnetic metal ribbon bonded to an outer periphery of the non-magnetic metal member by explosion bonding, wherein the explosion bonded composite body is heat treated to remove residual stress in the magnetic metal ribbon resulting from the explosion bonding; and
a reinforcing member fitted into the heat treated annular composite body, such that a tensile stress is imposed upon the magnetic metal ribbon in an amount sufficient to offset a compression stress which inherently occurs in the magnetic metal ribbon during cooling after the heat treatment.

8. An assembly of claim 7, wherein the non-magnetic metal member has a thermal expansion coefficient which is greater than that of the magnetic metal ribbon.

9. A method for producing an amorphous metal-metal composite body, comprising:
explosion bonding an amorphous metal to a metal member to form a preliminary composite body;
heat treating the preliminary composite body to remove residual stress in the amorphous metal resulting from the explosion bonding;
plastic working the heat treated preliminary composite body to impose a tensile stress upon the amorphous metal; and
cooling the heat treated preliminary composite body to form said amorphous metal-metal composite body, whereby a compression stress inherently occurs in the amorphous metal during cooling;
wherein the tensile stress is imposed upon the amorphous metal in an amount sufficient to offset the compression stress in the amorphous metal resulting from the cooling step.

10. The method of claim 9, wherein the metal member has a thermal expansion coefficient which is greater than that of the amorphous metal.

11. A method for assembling an amorphous metal-metal composite body to form an assembly, comprising:
explosion bonding an amorphous metal to a metal member to form a composite body;
heat treating the composite body to remove residual stress in the amorphous metal resulting from the explosion bonding; and
assembling the heat treated composite body into said assembly, such that a tensile stress is imposed upon the amorphous metal;
and cooling the assembly, whereby a compression stress inherently occurs in the amorphous metal;
wherein the tensile stress is imposed upon the amorphous metal in an amount sufficient to offset the compression stress resulting from the cooling step.

12. A torque sensor comprising an amorphous metal-metal composite body, said composite body comprising an amorphous metal explosion bonded to a metal member, wherein the composite body is heat treated to remove residual stress in the amorphous metal resulting from the explosion bonding, and the heat treated composite body is subjected to plastic working, such that a tensile stress is imposed upon the amorphous metal in an amount sufficient to offset a compression stress in the amorphous metal resulting from cooling the heat treated composite body.

13. A torque senor comprising an amorphous metal-metal composite body, said composite body comprising an amorphous metal explosion bonded to a metal member, wherein the composite body is heat treated to remove residual stress in the amorphous metal resulting from the explosion bonding, and the heat treated composite article is assembled into said torque sensor, such that a tensile stress is imposed upon the amorphous metal in an amount sufficient to offset a compression stress in the amorphous metal resulting from cooling the heat treated composite body.

* * * * *

UNITED STATES PATENT AND TRADEMARK OFFICE
CERTIFICATE OF CORRECTION

PATENT NO. : 4,906,306

DATED : March 6, 1990

INVENTOR(S) : Masatada ARAKI; Yutaka KUROYAMA; Yukihisa TAKEUCHI; Makoto TAKAGI; Yoshihito KAWAMURA; Toru IMURA It is certified that error appears in the above-identified patent and that said Letters Patent is hereby corrected as shown below:

ON THE TITLE PAGE, ITEM [73]

Please correct the name of the Assignee as follows:

Change "Nippon Denso Co., Ltd." to --Nippondenso Co., Ltd.--.

Signed and Sealed this

Fifteenth Day of October, 1991

Attest:

HARRY F. MANBECK, JR.

*Attesting Officer*    *Commissioner of Patents and Trademarks*